United States Patent
van der Wal et al.

(12) 
(10) Patent No.: US 6,482,375 B1
(45) Date of Patent: Nov. 19, 2002

(54) METHOD FOR CARRYING OUT A CHEMICAL REACTION

(75) Inventors: Willem Johan Jacob van der Wal, Leusden (NL); Antonius Johannes Maria van Wingerden, Twello (NL); Anthony van Waveren, Goor (NL); Erik Alexander Polman, Apeldoorn (NL); Alette Mulder, Uden (NL)

(73) Assignee: Gastec N. V., Apeldoorn (NL)

( * ) Notice: Subject to any disclaimer, the term of this patent is extended or adjusted under 35 U.S.C. 154(b) by 0 days.

(21) Appl. No.: 08/930,943

(22) PCT Filed: Apr. 12, 1996

(86) PCT No.: PCT/NL96/00163

§ 371 (c)(1),
(2), (4) Date: Jan. 15, 1998

(87) PCT Pub. No.: WO96/32188

PCT Pub. Date: Oct. 17, 1996

(30) Foreign Application Priority Data

Apr. 13, 1995  (NL) .............................................. 1000146

(51) Int. Cl.[7] .................................................. B01J 8/02
(52) U.S. Cl. ................. 423/210; 423/245.1; 423/245.3; 423/651; 423/652; 423/DIG. 6
(58) Field of Search ............................ 423/210, DIG. 6, 423/245.1, 245.3, 651, 652

(56) References Cited

U.S. PATENT DOCUMENTS

| | | | | |
|---|---|---|---|---|
| 3,925,252 A | | 12/1975 | Yabuta et al. ................ | 252/447 |
| 4,795,618 A | * | 1/1989 | Laumen ........................ | 422/202 |
| 5,366,719 A | * | 11/1994 | Van Wingerden et al. .. | 423/659 |
| 5,567,398 A | * | 10/1996 | Ruhl et al. ................... | 422/197 |
| 5,741,475 A | * | 4/1998 | Takashima et al. ......... | 423/559 |
| 6,096,286 A | * | 8/2000 | Autenrieth ................... | 423/651 |
| 6,113,874 A | * | 9/2000 | Kobayashi ................... | 423/650 |
| 6,402,988 B1 | * | 6/2002 | Gottzmann et al. ......... | 252/373 |

FOREIGN PATENT DOCUMENTS

| | | |
|---|---|---|
| BE | A 358876 | 4/1929 |
| EP | A0457352 | 11/1991 |
| FR | A1491051 | 11/1967 |
| FR | A1603801 | 6/1971 |
| GB | A 948085 | 1/1964 |
| JP | 47-16382 | * 9/1972 |
| JP | 56166937 | 12/1981 |
| JP | 63025201 | 2/1988 |
| JP | 6111838 | 4/1994 |
| WO | A8602016 | 4/1986 |

* cited by examiner

Primary Examiner—Stanley S. Silverman
Assistant Examiner—Timothy C Vanoy
(74) Attorney, Agent, or Firm—Weingarten, Schurgin, Gagnebin & Lebovici LLP

(57) ABSTRACT

The invention relates to a method for carrying out two chemical reactions in a reactor system comprising at least two mutually separate reactor beds, of which the surfaces exposed to the reactants are catalytically active for the chemical reactions concerned, and at least one partition; wherein at least one first reactor bed is present, which is bounded by at least one partition, which bed is based on a continuous porous structure extending throughout the reactor, and which bed is fixedly connected to said partition; wherein at least one second bed is preset, which is based on a continuous porous structure extending throughout the reactor, and which bed is fixedly connected to said partition, and said second bed, with respect to the first bed, is disposed on the other side of said partition, so that a heat-exchanging contact between said beds is present and the reaction heat of a first chemical reaction carried out in said first reactor bed is supplied or absorbed by carrying out a second chemical reaction in said second bed.

14 Claims, 1 Drawing Sheet

METHOD FOR CARRYING OUT A CHEMICAL REACTION

CROSS REFERENCE TO RELATED APPLICATIONS

This application is a national stage filing under 35 U.S.C. §371 of PCT/NL96/00163.

BACKGROUND

1. Field of Invention

The invention relates to a method for carrying out endothermic and exothermic chemical reactions.

2. Description

A great many chemical reactions are characterized by a positive heat effect (exothermic reaction) or a negative heat effect (endothermic reaction). To enable chemical reactions to proceed in the desired manner, an efficient supply or removal of the reaction heat is indispensable. In some exothermic reactions, the thermodynamic equilibrium shifts in an undesired direction if the temperature rises. Examples are the synthesis of ammonia and methanol, the oxidation of sulfur dioxide to sulfur trioxide in the production of sulfuric acid, the reaction of sulfur dioxide with hydrogen sulfide in the Claus process, the selective oxidation of $H_2S$ to elementary sulfur and the reaction of carbon monoxide with hydrogen to methane. Since in the course of these reactions thermal energy is released, the temperature of the reaction mixture will rise and the thermodynamic equilibrium will shift in an unfavorable direction, unless the reaction heat released is removed fast and efficiently from the reactor.

In endothermic reactions too, a shift of the thermodynamic equilibrium in an undesired direction can occur, now by the consumption of thermal energy. Examples are methane-steam reforming and the dehydrogenation of ethylbenzene to styrene. A problem may also arise in that as a result of the consumption of energy by the reaction, the temperature of the reaction mixture decreases unduly, so that the desired reaction no longer proceeds.

Not only can a temperature change cause a shift of the thermodynamic equilibrium in an unfavorable direction, it can also adversely affect the selectivity of catalytic reactions.

Examples of reactions where the temperature affects the selectivity are the production of ethylene oxide from ethylene (the undesired reaction is the formation of water and carbon dioxide), the selective oxidation of hydrogen sulfide to elementary sulfur (the undesired reaction is the formation of $SO_2$) and the Fischer Tropsch synthesis. In all cases, a temperature rise occurs as a result of the release of the reaction heat. If this temperature rise is not prevented through a rapid removal of the reaction heat, the selectivity decreases greatly.

In most conventional catalytic reactors, use is made of a fixed bed of catalyst particles. In such a catalyst bed, porous bodies of catalyst particles have been poured or piled.

In order to avoid an undesirably high pressure drop across such a catalyst bed, it is preferred to use bodies or particles of dimensions of at least 0.3 mm. These minimum dimensions of the catalyst bodies are necessary to keep the pressure drop that occurs upon the passage of a stream of reactants through the catalyst bed, within technically acceptable limits. While the dimensions are limited at the lower end of the range by the permissible pressure drop, the necessary activity of the catalyst imposes an upper limit on the dimensions of the catalytically active particles. The high activity required for a number of types of technical catalysts can mostly be achieved only with a surface of the active phase of 25 to 500 $m^2$ per ml catalyst volume. Surfaces of such an order of magnitude are possible only with very small particles, for instance with particles of 0.05 $\mu m$. Since particles with such dimensions no longer allow a liquid or gas mixture to flow through them, the primary, extremely small particles have to be formed into high-porous bodies with dimensions of at least about 0.3 mm, which can possess a large catalytic surface. An important task in the production of technical catalysts is to combine the required high porosity with a sufficiently high mechanical strength. The catalyst bodies cannot be allowed to disintegrate upon filling of the reactor and upon exposure to sudden temperature differences (thermal shock).

Under the conditions of the thermal pretreatment and/or catalytic reaction to be carried out, nearly all catalytically active materials soon sinter to form large conglomerates with a negligibly small active surface. Therefore, the active component (finely divided) is generally applied to a so-called support. This support exhibits the necessary thermal stability and hardly sinters, if at all, at high temperatures. Often used as supports are silicon dioxide, aluminum oxide or activated carbon.

As appears from the above examples, there is a very great need for a fast supply or removal of thermal energy in catalytic reactors, but the total heat transfer coefficient is mostly very low in a fixed catalyst bed. According to the present state of the art, it is virtually impossible to supply thermal energy to or remove it from a fixed catalyst bed in an efficient manner. This is indeed evident from the manner in which chemical reactions are carried out in fixed catalyst beds.

It is possible that of an exothermic reaction only the thermodynamic equilibrium shifts in adverse direction upon a temperature rise, without the selectivity decreasing unallowably. In that case, the reaction in a fixed catalyst bed can be made to proceed adiabatically. After passage through the reactor, the stream of reactants is cooled off in a separate heat exchanger. Because the conversion of the reactants is now thermodynamically limited by the temperature rise in the reactor, the unconverted reactants have to be reacted again upon cooling. The reaction product can be separated and the reactants can be recycled through the fixed catalyst bed. This occurs, for instance, in the ammonia and methanol synthesis. If the reaction product cannot be easily separated, downstream of the heat exchanger a second fixed bed reactor with a heat exchanger must be linked up. This is for instance the case in the oxidation of sulfur dioxide to sulfur trioxide. Sometimes, to prevent emission of harmful compounds, even a third reactor with heat exchanger is necessary. If connecting a number of reactors and heat exchangers in series is not properly possible and the separation of the reaction product is not either, the reaction product is sometimes recirculated through the catalyst bed. Per passage through the reactor, so little of the reactants is added to the circulating reaction product that it is converted completely. Because the rise of the temperature must then be properly controlled, per passage through the reactor only very little can be converted. In cases where the reaction must be carried out at a greatly increased pressure, the problems with the supply or removal of the reaction heat are extra large.

In the ammonia synthesis and the methanol synthesis, a catalyst bed is employed in which reactants are injected at different points at a relatively low temperature.

Such an implementation of the method, whereby gas streams must be passed through high pressure reactors in a complicated manner, obviously also requires high investments.

In a number of technically important cases, it is desired in catalytic reactions to work with a high to very high spatial throughput rate, with a great pressure drop across the reactor being considered a less serious drawback. In the conventional fixed bed reactors, a high pressure drop with the corresponding high spatial throughput rate is not properly possible. If the pressure at the reactor inlet is increased, the catalyst may be blown (gaseous reactants) or washed (liquid reactants) out of the reactor. It is also possible that at a particular critical value of the pressure at the reactor inlet "channeling" occurs. In that case, the catalyst particles in a particular part of the reactor are going to move. In that case, the reactants are found to flow virtually exclusively through the part of the catalyst bed that is in motion.

With the fixed bed reactors current at present, the catalyst bed clogs up. Therefore the reactor must be regularly opened and the cumulated layer of dust removed. It would be favorable if a pulse of gas of high pressure could be sent through the reactor in a direction opposite to that of the stream of reactants. This pressure pulse would blow the dust off the catalyst bed; thus, clogging could be prevented without opening the reactor, which is technically very attractive. With the fixed bed catalysts according to the present state of the art, however, this is not possible; along with the dust, the catalyst bodies would be blown out of the catalyst bed.

It will be clear that a number of disadvantages can be associated with the use of fixed bed reactors. In general, it requires costly facilities, while recirculation and separation of reaction products present in low concentration require a great deal of energy. For that reason, in a number of cases a whirling bed is employed. In a whirling bed the transport of thermal energy is much easier, while the problems with pressure drop and clogging do not occur. In a whirling bed, however, the catalyst to be used must meet very high standards regarding mechanical strength and wear resistance, which is not at all possible with every catalyst. Finally, the catalyst consumption in a whirling bed is relatively high due to the unavoidable wear. Accordingly, in many cases it will not be possible to use a whirling bed.

There are cases where it is not possible to work either with a whirling bed or with an adiabatic reactor. This applies in particular to highly endothermic reactions and reactions where the selectivity decreases unallowably upon increase of the temperature. Examples are methane-steam reforming and the selective oxidation of ethylene to ethylene oxide. In a selective oxidation of ethylene, a very large heat exchanging surface is employed by utilizing a reactor with no less than 20,000 long tubes. In methane-steam reforming it is attempted to optimize the heat supply and to limit the pressure drop by adjusting the dimensions and the shape of the catalyst bodies. In this last reaction too, a large number of costly tubes have to be used in the reactor.

It has also been proposed to apply the catalyst exclusively to the wall of the reactor. An example of such a system is described in the abstract of JP-A 6/111838. According to this publication, a reform catalyst has been provided in grooves of a plate, while in grooves of a second plate a combustion catalyst has been provided. These plates have been arranged against each other, so that through the heat generated with the combustion the reforming can take place.

Also in carrying out the Fischer Tropsch reaction, in which from a mixture of hydrogen and carbon monoxide higher hydrocarbons are produced, a system has been employed, in which a catalyst is provided on the wall of the reactor. This catalyst provided on the wall ensures a good heat transfer from the catalyst to the outside of the reactor. For providing the catalyst on the wall, inter alia the following method has been proposed. The catalyst is applied as a Raney metal, an alloy of the active metal and aluminum. After being applied, the catalyst is activated by dissolving the aluminum with lye. The greater part of the reactor volume is empty, as a result of which the contact between the reactants and the catalytically active surface is slight and the conversion per passage through the reactor is greatly limited. The reactants must therefore be frequently recirculated through the reactor.

In a number of technically important cases, the pressure drop upon passage of the reactants through the catalyst bed must remain very low. This applies, for instance, to reactors in which flue gas of large plants is to be purified, as with the catalytic removal of nitrogen oxides from flue gas. Because a flue gas stream is generally very large, a substantial pressure drop requires a very great deal of mechanical energy. The same applies to the purification of exhaust gases of automobiles. In this case too, a high pressure drop is unallowable.

Currently, the use of catalysts provided on a honeycomb is one of the few possibilities of achieving an acceptable pressure drop without unallowably reducing the contact with the catalyst. To that end, often ceramic honeycombs (honeycombs, monoliths) are used, in which the catalytically active material has been provided.

A variant of the method in which the catalyst is provided exclusively on the wall, is the use of monoliths made up of thin metal sheets. Such a reactor is manufactured, for instance, by rolling up a combination of corrugated and flat thin metal sheets and subsequently welding them together. It is also possible to stack the flat sheets in a manner leading to a system with a large number of channels. On the wall of the thus-obtained channels the catalyst is then provided.

As has been noted, the thermal conduction in a fixed catalyst bed is poor. This has been ascribed to the low thermal conductivity of the high-porous supports on which the catalytically active material has been provided. Therefore Kovalanko, O. N. et al., Chemical Abstracts 97 (18) 151409u have proposed to improve the thermal conduction by increasing the conductivity of the catalyst bodies. They did this by using porous metal bodies as catalyst support. Now, it has already been described by Satterfield that the thermal conductivity of a pile of porous bodies is determined not so much by the conductivity of the material of the bodies, as by the contacts between the bodies among themselves (C. N. Satterfield, "Mass Transfer in Heterogeneous Catalysis", MIT Press, Cambridge, Mass., USA (1969), page 173). The inventors' own measurements have shown that the thermal conductivity of catalyst bodies indeed does not greatly affect the heat transport in a catalyst bed.

In WO-A 86/02016 a reactor is described, comprising a reaction bed provided with a catalyst, which bed consists of sintered metal particles which are in good heat conducting communication with the reactor wall, which wall is externally provided with sintered metal particles for removing reaction heat. Further, on the outside of the reactor a phase transition occurs. Such a reactor system is found to be able to realize a large heat dissipation, but has the disadvantage that a good setting and/or control of the reaction is not possible, or very difficult. This is evident inter alia from the example in which the catalytic combustion of a combustible gas with a heat of combustion of 35.530 $kJ/m^3$ is described. This would have to occur at a temperature of 350° C. However, by the cooling of the reactor with evaporating water (steam production) at 110° C., the entire reactor is cooled to 110° C., so that the reaction will not occur.

In U.S. Pat. No. 4,101,287 a combined heat exchanger reactor is described, consisting of a monolith, through a part of the channels of which flow the reactants and through a part of which flows the cooling agent. Here the same disadvantage as in the system of WO-A 8602016 presents itself.

In EP-A 416710 a method is described, based on the use of a catalytic reactor in which the reactor bed consists of elementary particles of metal sintered to each other and to one side of the reactor wall, while no sintered metal particles are present on the other side of the reactor wall. When in such a reactor the diameter of the reactor bed is chosen in relation to the heat effects, which vary from one reaction to another, but are known and, depending on the reaction conditions, can be calculated, reactions of the type referred to can be carried out optimally.

In carrying out chemical reactions, especially if they are reactions which are carried out on a large scale, if a strong heat effect is involved, or if high pressures are required, problems accruing from the heat economy of the reaction are encountered. It appears that in a number of cases it is not easy to efficiently supply the necessary heat or remove the heat produced. For instance in steam-reforming natural gas or other hydrocarbons, the necessary amount of heat is so large that complex systems with burners and heating tubes are needed to supply the necessary heat. This kind of problems also occurs with other reactions with great thermal effects, such as the production of ammonia, the preparation of ethylene oxide, the selective oxidation of $H_2S$, and the like. Even in reactors according to the above-mentioned EP-A 416710 or U.S. Pat. No. 4,101,287, it is found this can give rise to problems.

Presently, mixtures of hydrogen and carbon monoxide (synthesis gas) are produced through reaction of methane with steam, the so-called methane-steam reforming process. If only hydrogen is desired, the carbon monoxide is allowed to react with steam to form carbon dioxide and hydrogen. The carbon dioxide formed is removed through dissolution under pressure in aqueous solutions or regenerable solid sorbents.

For this process, it is possible to use, besides methane, other gaseous hydrocarbons or naphtha or other hydrocarbons that can be readily brought into the gas phase.

To enable the highly endothermic reaction between methane and steam to proceed, the necessary reaction heat must be supplied to the reaction mixture at a high temperature, for instance 850° C. (allothermic process). In general, the necessary heat is generated outside the reaction mixture by combustion of, for instance, methane. In order to transfer the thus generated thermal energy to the reaction mixture, a partition with a sufficiently high thermal conductivity must be used.

Through radiation the reaction heat generated in the combustion reaction is transferred to the reaction mixture. The reaction mixture is passed through tubes of a high-grade alloy in which a suitable catalyst has been provided. The tubes are exposed to the radiation of the burners.

To prevent oxidation of the tubes at the necessary high temperatures, costly (nickel-containing) alloys must be used for the reactor wall. To save energy, the methane-steam reforming process is often carried out at elevated pressure, for instance at 30 bar, which imposes even more stringent requirements of oxidation resistance.

For the steam-reforming mentioned, it has previously been proposed to carry out a partial oxidation of the hydrocarbon prior to the reaction. The heat thereby produced is then stored in the gas and carried to the steam reforming. Such a method, however, cannot be employed in all cases.

BRIEF SUMMARY OF THE INVENTION

The object of the invention is to provide a suitable method for carrying out chemical reactions and in particular chemical reactions with a great thermal effect, whereby in a simple manner the transport of the necessary or redundant heat is provided for.

The invention is based on the surprising insight that it is possible to optimally adjust the heat conduct of combined endothermic and exothermic reactions to each other if use is made of a specific reactor system in which at least two reactor beds based on porous structures are in heat exchanging relation with each other.

The invention accordingly relates to a method for carrying out two chemical reactions in a reactor system comprising at least two mutually separate reactor beds, of which the surfaces exposed to the reactants are catalytically active for the chemical reactions concerned, and at least one partition, wherein at least one first reactor bed is present, which is bounded by at least one partition, which bed is based on a continuous porous structure and which bed is fixedly connected to said partition, at least one second bed is present, which is based on a continuous porous structure, and which bed is fixedly connected to said partition, and said second bed, with respect to the first bed, is disposed on the other side of said partition, so that a heat exchanging contact between said beds is present and the reaction heat of a first chemical reaction which is carried out in said first reactor bed is supplied or absorbed by carrying out a second chemical reaction in said second bed.

Over the above-described known systems, the invention has the advantage that during the process a greater stability is obtained, inter alia because of the self-regulating character of the system.

DETAILED DESCRIPTION OF THE INVENTION

Figure 1:
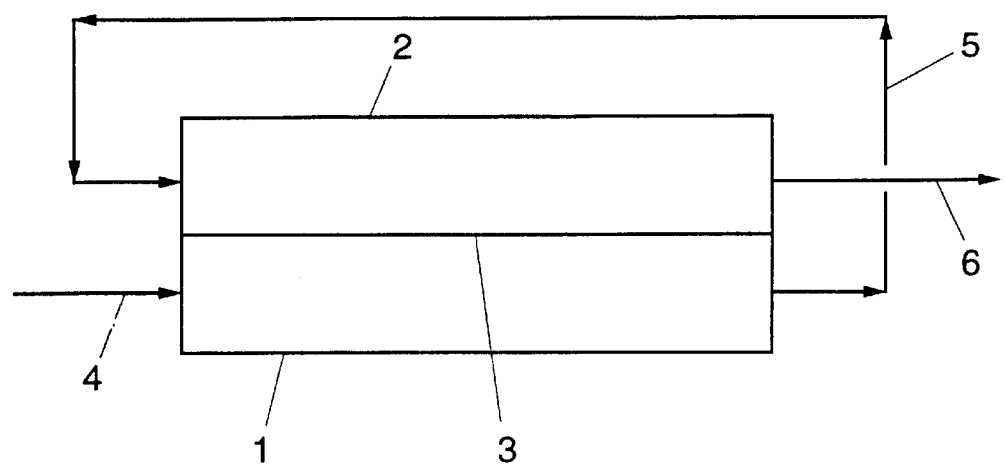
FIG. 1 shows a flow diagram of an endothermic reaction and an exothermic reaction occurring in a two-reaction system.

According to an embodiment of the method according to the invention, a reactor is used in which two or more first reactor beds and/or two or more second reactor beds are used which, through a corresponding number of partitions, are in heat exchanging relation with each other.

According to the invention, it is possible in a simple manner to efficiently transport the necessary heat to the desired place. According to a first variant of the method according to the invention, in the first reactor bed an endothermic reaction is carried out and in the second reactor bed an exothermic reaction is carried out.

According to another variant of the invention, in the first reactor bed an exothermic reaction is carried out and in the second reactor bed an endothermic reaction is carried out.

According to yet another embodiment of the method according to the invention, a multi-stage reaction is carried out, wherein at least one stage of this reaction has a positive and at least one stage has a negative heat effect, and wherein said stages are carried out in said first and second reactor bed.

An example of this last variant is formed by the above-mentioned steam reforming, preceded by partial oxidation. The heat necessary for the steam reforming is then supplied by the partial catalytic combustion of the hydrocarbon in the first reactor bed, while the heat produced is supplied to the steam reforming via the common partition. The gases are thereupon supplied to the second reactor bed, where they are further converted.

Other suitable reactions that can be carried out according to the invention are, for instance, the preparation of ethylene oxide, the selective oxidation of $H_2S$, hydrogenation reactions, dehydrogenation reactions, such as the formation of styrene from ethylbenzene, the oxidation of methanol to formaldehyde, the conversion of methanol into synthesis gas, and the like. It is noted in this connection that the catalytic combustion of hydrocarbons to form $CO_2$, water and heat, can also be regarded as a chemical reaction within the scope of this invention.

A suitable possibility for carrying out the method according to the invention, with the desired chemical reaction being an endothermic reaction, is therefore the catalytic combustion of hydrocarbons, in particular natural gas, in the first reactor bed, while the endothermic reaction is carried out in the second reactor bed.

The catalytic combustion occurs in the presence of a suitable combustion catalyst, for instance copper oxide or manganese oxide on a thermostable support. A very suitable catalyst is described, for instance, in EP-A 327,177. However, the art has a large number of other suitable combustion catalysts.

The chemical reactions that are carried out according to the invention take place under the most suitable conditions for the reactions chosen. With a view to a good heat exchange between the reactor beds, the temperatures in the two reactor beds will not differ greatly. In general, the temperature difference will not be more than about 100° C., more particularly this difference will be less than 50° C. As a result, also the stability and the self-regulating character are improved.

Through a suitable choice of load and degree of conversion in the two reactors, the temperatures in the two beds can be optimally adjusted to each other. In doing so, it is obviously possible to use all conventional variants in the manner of supplying reactants, recirculating a part of the reaction mixture, supplying or discharging reactants and/or reaction products at different points in the reactor, and the like.

The temperature employed in the reactors is dependent on the nature of the reactions. In general, an elevated temperature is employed, because then the advantages of the system are most pronounced. In general, the temperature will be above 100° C., an upper limit being formed by the maximum temperature at which the material is still stable, or the temperature that can be achieved with a chemical reaction. However, temperatures in excess of 1250° C. are generally not preferred because of the difficulties in achieving them and the requirements that such temperatures impose on the materials of the reactors and the supply and discharge systems.

The pressures at which the various reactions are carried out, can be varied within wide limits, it being noted that it is also possible to carry out the reactions at different pressures. Although this imposes more stringent requirements on the equipment, there is no fundamental problem.

In the present description, the term "partition" is understood to refer to the physical separation between the space where the first reaction occurs, that is, the first reactor bed, and the space where the second reaction occurs, the second reactor bed. This can obviously be the outer wall of the catalyst bed, but it also encompasses, for instance, a wall of channels of a monolith or the metal sheets of a rolled-up assembly.

The wall can consist of the conventional materials that are known for these purposes. These walls can consist of a single layer, but it is also possible to use more than one layer, and it can specifically provide advantages if the surface to which the elementary bodies are to be fixedly connected, improves the bond with the elementary bodies. In this connection one can think, for instance, of the use of enamel coating in ceramic elementary bodies.

The continuous porous structure which is used in the reactor in accordance with the invention can be constructed in various ways, as will also appear from the further explanation and the examples of suitable structures. In general, the continuous porous structure should meet the requirement that there is a heat exchanging contact between the partition and the structure, while further the porous structure extends through the entire reactor bed.

This means that the porous structure is fixedly connected to at least one reactor wall, while the reactor bed consists of a structure which fills the entire reactor bed, at least, extends through the entire reactor bed, for instance in the form of fixedly interconnected elementary particles, such as particles sintered together, or channels, arranged parallel, of a suitable sheet construction or of a monolith.

Accordingly, this does not encompass the system as described in JP-A 6/111838, since no continuous porous structure is thereby obtained. In fact, the walls of each channel constitute a reaction wall, whereas according to the invention a porous structure is required.

With the invention, the degree of porosity of the reactor bed can be varied within wide limits. This porosity, that is, the portion of the bed that allows gas or liquid to flow through, is generally between 20 and 95% by volume. The most suitable value depends on the nature of the reactor, the desired surface, the desired pressure drop and the extent of heat transport in the bed.

The porosity can be distributed uniformly in the reactor bed, but it is also possible to provide a gradient in the porosity, for instance in the longitudinal direction viewed in the direction of flow of the reactants, or in the transverse direction. It is also possible for this porosity not to be uniformly distributed through the reactor bed, for instance as is the case when a monolith is used.

The extent of heat transport is a relatively important factor in the reactor system according to the invention. Obviously, the heat conductivity of the total system, that is, from the partition as far as into the beds, is partly determined by the heat conductivity of the material of the catalyst support used and of the construction material of the reactor.

Preferably, the heat conductivity is not less than 10% of the heat conductivity of the material used in massive condition; preferably, this value is between 10 and 75%. In absolute terms, the heat conductivity is preferably between 0.2 and 300 W/m·K.

The heat conductivity is highly dependent on the heat conductivity of the elementary materials used. $Al_2O_3$ extrudate, for instance, has a conductivity of 0.32 W/m.K, while a sintered body of 316L has a value of 3–12 W/m·K. Powder of 316L, by contrast, has a value of 0.55, while massive material possesses 20 W/m·K. Massive copper has a heat conductivity of 398 W/m·K. All of these values relate to the condition at room temperature. At other temperatures, the absolute value of the numbers changes, but the relative ratio remains approximately the same.

The heat conductivity of the system as a whole is also important for the operation thereof. As has been indicated, there should be a heat exchanging contact between the two reactor beds. More particularly, it is of importance that there is a fixed connection, under reaction conditions, between the partition and each reactor bed. More particularly when using sintered metals as support of the catalyst bed, this can be obtained by sintering the elementary metal particles fixedly onto the wall, but it is also possible for the materials to be applied in such a manner as to have a heat transfer comparable to that of the sintered-on metals. When using a catalyst provided on the partition, optionally with a support material interposed between them, obviously one also has a good heat exchanging contact between the beds. Such systems can, for instance, consist of an assembly of (rolled-up) sheets or a monolith, in which on the walls a catalyst (optionally supported) has been provided, by means of a wash coat. In such a variant, a part of the rolled-up sheets or the monoliths, for instance an inner core, constitutes the first reactor bed, while another part, for instance a ring around the core, constitutes the second reactor bed. Obviously, there may be more than two reactor beds. It is possible, for instance, to make a kind of shell structure with different 'rings'.

The reactor system according to the invention is applicable to each heterogeneously catalyzed gas phase reaction, but is more particularly suitable for those reactions that have a strong thermal effect, that is, highly endothermic or exothermic reactions, or reactions whose selectivity is highly temperature-dependent.

In the embodiment according to the invention based on sintered metal beds, it is possible to work with a high to very high spatial throughput rate without the catalyst being blown (gaseous reactants) or washed (liquid reactants) from the reactor. Nor does "channeling" occur. Because in the reactor according to the invention the catalyst particles are much better fixed, such a reactor allows working at a much higher velocity of the reactants (and consequently a much higher pressure drop across the reactor). Another important advantage of fixing the catalyst bodies in the reactor according to this embodiment, is evident when dust is deposited on the catalyst bed. In reactors according to the present invention, a pulse of gas of high pressure can be sent through the reactor in a direction opposite to that of the stream of reactants. This pressure pulse blows the dust off the catalyst bed; as a result, clogging can be prevented without opening the reactor, which is technically very attractive.

With non-sintered material, the reactor bed has a high porosity adjacent the wall, owing to the fact that the shape of the material particles and the wall do not conform to each other. As a result, there is little catalyst present at this location and relatively much less feed will be converted. This effect is enhanced in that the high porosity has low pressure losses and the feed will flow preferentially along the wall. By sintering, on the other hand, conformity with the wall is improved and the porosity adjacent the wall is of the order of magnitude of the bed material not located adjacent the wall. Moreover, by applying the catalyst after filling and sintering of the reactor, catalyst is also deposited on the wall. These two effects have as a result that leakage along the wall is much less and the reactor as a whole can be made of shorter construction. Thus the pressure drop remains limited.

When using a reactor system based on plates or a honeycomb, the advantage that no leakage occurs is gained to a lesser extent, but on the other hand these reactors are simpler to construct and have a lower pressure drop and are less prone to clogging.

The invention is particularly suitable for carrying out highly exothermic or endothermic catalytic reactions. As an example of such a reaction, the oxidation of methane is described. As an example of a reaction whose selectivity is to a large extent determined by the temperature, the selective oxidation of hydrogen sulfide is taken. In this case the removal of thermal energy is of great significance since above a temperature of about 300° C. the oxidation of sulfur vapor to the undesired sulfur dioxide starts to proceed. Use of a reactor system according to the invention makes it possible to purify gas streams of a hydrogen sulfide content of, for instance, 10% by volume highly efficiently. The hydrogen sulfide is selectively oxidized to elementary sulfur which is extremely easy to separate through condensation. Because such gas mixtures cannot be properly processed in a Claus process, the invention is of particularly great importance for this purpose.

As has already been indicated, the reactor system that is used according to the invention can be made up in a number of ways.

When using reactor beds based on sintered metal particles, in a first variant the reactor beds are arranged concentrically around each other. According to another variant, the reactor beds are plate-shaped, one or more first interconnected reactor beds being alternated in layers with one or more interconnected second reactor beds.

The reactor beds based on sintered particles are most preferably made up of more or less isotropic particles, more particularly with a fairly narrow particle size distribution. When using such elementary particles, a catalyst system with very good properties is obtained.

The material of which the elementary particles consist is preferably metal, but can also be alumina, silica, silica-alumina, zeolite, titanium dioxide, zinc oxide or zirconium oxide, or oxides of a combination of elements, such as spinel ($MgAl_2O_4$), mullite ($3Al_2O_3.2SiO_2$) or cordierite ($2MgO.2Al_2O_3.5SiO_2$), as well as carbides, nitrides and borides of elements such as silicon, tungsten, titanium and vanadium. The preference is for metal or metal alloys, because elementary particles consisting of these materials can be fixedly connected to each other and to the partition wall relatively easily by sintering. The metal or the metal alloy can then be catalytically active itself or be rendered catalytically active, but it is also possible to provide a catalytically active material thereon. One of the advantages of a catalyst on such metal particles resides in the better heat distribution by the use of the metal. On a microscale it is observed that the heat conduct in the catalyst is better, so that a more efficient use can be made of the catalyst. This has an influence inter alia on the activity, but can also be of importance for the selectivity, for instance in case the selectivity is highly dependent on the temperature, since according to the invention a much more homogeneous temperature distribution is obtained in the catalyst.

Suitable metals for use in elementary particles are inter alia nickel, iron, chromium, manganese, vanadium, cobalt, copper, titanium, zirconium, hafnium, tin, antimony, silver, gold, platinum, palladium, tungsten, tantalum, as well as the lanthanides and actinides. The elementary particles can consist of substantially pure metal or of an alloy of two or more metals, which alloy can also contain non-metallic components, such as carbon, nitrogen, oxygen, sulfur, silicon, and the like.

According to another embodiment of the invention, the elementary particles consist of fibers or threads, preferably of a diameter of 0.5 mm at most, preferably of 1–250 μm. The materials of which these particles are manufactured preferably comprise carbon and metal or metal alloys.

According to another embodiment of the invention, a plate reactor is used, for instance made up of a more or less flat plate, which is provided with a corrugated plate, welded onto the flat plate along the tops of the corrugated plate. This assembly is then (for instance rolled up and) welded together again, so that a reactor is obtained, consisting of a large number of channels which extend parallel to each other, on opposite sides of the plates. This reactor can be provided with a coat with catalyst in a manner similar to that described hereinabove. The ends of the reactor are provided with appropriate constructions to ensure that the various reactants and reaction products are distributed over the proper channels. The metals of which such a reactor can be manufactured are generally the same metals as described hereinabove in relation to the sintered metals. There is a particular preference for an alloy of inter alia iron and chromium, known under the name of FeCralloy$^R$. The invention also relates to such a plate reactor.

According to yet another variant of the invention, as reactor system a honeycomb or monolith is used. Such systems are known and are generally characterized on the basis of the materials of which they are made and the number of channels per unit area. Monoliths can be manufactured from ceramic materials, such as mullite ($Al_6Si_2O_{13}$), titanium dioxide, and α-alumina, or of metals, the above-mentioned metals being specifically eligible. Typical cell densities of monoliths are between 100 and 400 cells per (inch)$^2$. The cell walls are thin and vary between 50 and 200 μm. At a cell density of 400 cpi, about 3500 m$^2$ surface per m$^3$ monolith is available.

In a next variant of the invention, as a reactor system a foam or other porous structure is used.

The reactor system according to the invention, as has already been indicated, can already be catalytically active of itself or be activated by treatment. However, it is also very well possible to provide a catalytically active material on the fixedly connected elementary bodies. More particularly, it is possible first to provide a (highly) porous support on the metal surface or alloy surface and thereafter to provide the catalytically active component on the support. This last can be of significance if the catalytically active component may not come into direct contact with the material of the bodies sintered together, so as to prevent undesired interactions between the material of the bodies and the catalytically active component.

When applying the catalyst, first a dispersion of a support and/or the catalytically active material (or a precursor thereof) in a liquid is prepared and thereafter this liquid is suitably applied to the fixedly connected elementary bodies. This can be done, for instance, by vacuumizing the bed to which the support and/or the catalytically active material are to be applied and thereafter sucking the dispersion into the bed, so that the bed is impregnated. If a support is provided first, the operation can be repeated with the catalytically active component or precursor thereof.

The composition of the dispersion and the conditions for manufacturing the system are preferably chosen such that the viscosity of the impregnation liquid is raised upon impregnation, since in that way it is possible to remove the liquid phase from the dispersion without the distribution of the catalytically active material being substantially disturbed. Moreover, in this way a better distribution of the catalytically active material over the fixedly connected elementary bodies is obtained. A number of methods are conceivable for increasing the viscosity of the liquid. A first method is to cool to below the solidification point thereof, so that the entire mass solidifies. By using vacuum, the system can then be freeze-dried. Another possibility, and this one is preferred, is to incorporate a small amount of agar or another substance with comparable activity into the dispersion, which affords the possibility of introducing the dispersion into the system at increased temperature and thereafter fixing the system by simply cooling off. Thereupon the liquid can be removed under vacuum or otherwise, and the agar can be removed at increased temperature through pyrolysis. The suitable amount of agar is substantially determined by the desire that it must be possible for the liquid to become sufficiently viscous or even solid. Suitable concentrations are between 0.05 and 1.0% by weight.

It is also possible to apply the catalyst as a so-called wash coat.

In the drawing, the invention is further explained. FIG. 1 shows a flow diagram of a reaction in which in a first stage an exothermic reaction is carried out, while in a second stage an endothermic reaction occurs.

Figure 2:
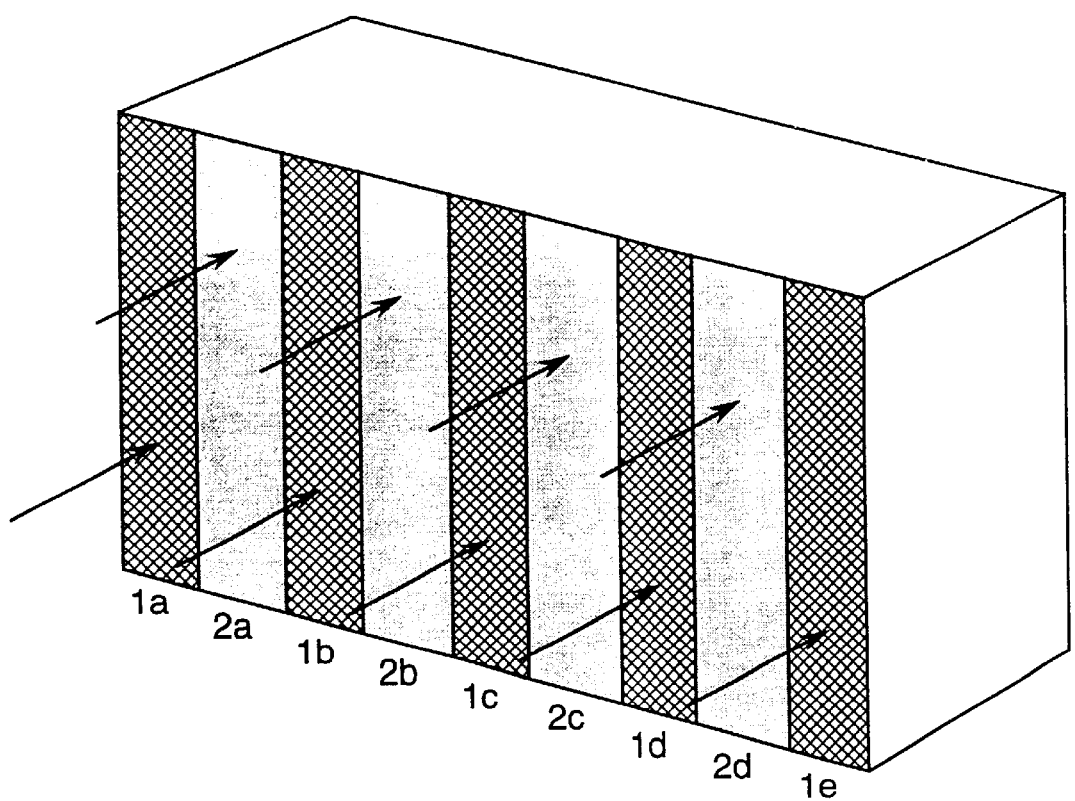
FIG. 2 schematically represents a reaction system based on a plate reaction.

FIG. 2 schematically represents a reactor system based on a plate reactor.

FIG. 1 shows two reactors 1, 2 which via a wall 3 are in heat exchanging contact with each other. Via line 4, reactants are supplied to reactor 1, while the reaction mixture is discharged via line 5 and is passed to the inlet of reactor 2. Via line 6 the reaction mixture egressing from reactor 2 is thereupon discharged.

In FIG. 2 a schematic arrangement of a plate reactor is given. The compartments of the first reactor ($1^a$, $1^b$, $1^c$, $1^d$, $1^e$) are separated from the compartments of the second reactor ($2^a$, $2^b$, $2^c$, $2^d$) by the intervening partitions.

The invention will now be elucidated in and by a few examples, which are not intended as a limitation of the invention.

EXAMPLE 1

A reactor consisting of a continuous porous metal structure is fixedly connected through the partition to a second reactor, likewise consisting of a continuous porous metal structure, so that a heat exchanging contact is present. The porous metal structures are made up of metal particles fixedly sintered to each other and to the partition.

In the first reactor, the surface exposed to the gas phase is catalytically active for the oxidation of methane. To that end, a thermostable alumina support provided with copper has been applied to the surface of the metal in the first reactor.

In the second reactor, the surface exposed to the gas phase is catalytically active for the steam reforming of methane. To that end, an alumina support with nickel thereon has been applied to the metal surface of the second reactor.

Through the first reactor, a methane/air mixture is passed continuously, with a methane/air ratio (based on volume) at the reactor inlet of 0.03, and with a temperature of 550° C. In the first reactor the methane reacts completely with the oxygen through the contact with the catalyst, so that the temperature in the reactor rises. The maximum value the temperature achieves is about 900° C.

Through the second reactor, cocurrently and continuously, a methane/steam mixture is passed with a methane/steam ratio (molar) at the reactor inlet of 0.33.

In the presence of the catalyst, methane reacts completely with steam to form CO and $H_2$. The temperature at the inlet is 600° C., which achieves a maximum value of about 800° C.

The heat generated in the first reactor is sufficient for the endothermic reaction in the second reactor. This heat is passed to the second reactor through the conducting partition. For transferring a sufficient amount of heat to the second reactor, the amount of methane that is converted in the first reactor is approximately half of the amount of methane that reacts in the second reactor.

EXAMPLE 2

A reactor consisting of a continuous porous metal structure is fixedly connected via the partition to a second reactor, likewise consisting of a continuous porous metal structure, so that a heat exchanging contact is present. The porous metal structures are made up of metal particles sintered fixedly to each other and to the partition.

In the first reactor, the surface exposed to the gas phase is catalytically active for the oxidation of methane. To that end, a thermostable alumina support provided with copper has been applied to the surface of the metal in the first reactor.

In the second reactor, the surface exposed to the gas phase is catalytically active for the conversion of ethylbenzene into styrene. To that end, an iron/chromium oxide catalyst on an alumina support has been applied to the metal surface of the second reactor.

Through the first reactor, a methane/air mixture is passed continuously, with a methane/air ratio (based on volume) at the reactor inlet of 0.03, and with a temperature of 550° C. In the first reactor the methane reacts completely with the oxygen through the contact with the catalyst, so that the temperature in the reactor rises. The maximum value the temperature achieves is about 900° C.

Through the second reactor, cocurrently and continuously, an ethylbenzene/steam mixture is passed with an ethylbenzene/steam mass ratio at the reactor inlet of 1.

In the presence of the catalyst, ethylbenzene reacts with steam to form styrene at a pressure of 0.4 bar. The temperature at the inlet is 550° C., which rises with the passage through the reactor and achieves a maximum value of about 650° C. The conversion of ethylbenzene is 50%.

The unreacted ethylbenzene is separated from the reaction mixture and returned to the reactor inlet. Styrene is also separated and recovered.

The heat generated in the first reactor is sufficient for the endothermic reaction in the second reactor. This heat is passed to the second reactor through the conducting partition. For transferring a sufficient amount of heat to the second reactor, the amount of methane that is converted in the first reactor is 15 mol. % of the amount of ethylbenzene supplied to the second reactor.

EXAMPLE 3

A reactor consisting of a continuous porous metal structure is fixedly connected via the partition with a second reactor, likewise consisting of a continuous porous metal structure, so that a heat exchanging contact is present. The porous metal structures are made up of metal particles fixedly sintered to each other and to the partition.

In the first reactor, the surface exposed to the gas phase is catalytically active for the oxidation of methanol. To that end, an iron/molybdenum oxide catalyst on alumina has been applied to the surface of the metal in the first reactor.

In the second reactor, the surface exposed to the gas phase is catalytically active for the conversion of methanol into synthesis gas. To that end, a copper/zinc catalyst on alumina has been applied to the metal surface of the second reactor.

Through the first reactor, a methanol/air mixture is passed continuously, with a methanol/air ratio (based on volume) at the reactor inlet of 0.06 and a temperature of about 300° C. In the first reactor the methanol reacts in the presence of the catalyst with oxygen. As a result, the temperature rises and achieves a maximum value of about 400° C. The conversion of methanol into formaldehyde is 95%.

Through the second reactor, cocurrently and continuously, a methanol/steam mixture is passed with a methanol/steam ratio (molar) at the reactor inlet of 0.8.

In the presence of the catalyst, methanol reacts with steam to form CO and $H_2$. The temperature at the inlet is 200° C. With the passage through the reactor, it rises and achieves a maximum value of about 250° C. The conversion of methanol is 100%.

The heat generated in the first reactor is sufficient for the endothermic reaction in the second reactor. This heat is passed to the second reactor through the conducting partition. For transferring a sufficient amount of heat to the second reactor, the amount of methanol that is supplied to the first reactor is about 60% of the amount of methanol that reacts in the second reactor.

What is claimed is:

1. A method for carrying out two different chemical reactions in a reactor system, said method comprising
   a. providing a reactor system comprising
      1) at least two mutually separate reactors each containing a reactor bed, of which reactor beds the surfaces exposed to the reactants are catalytically active for the chemical reactions concerned, and
      2) at least one partition between the two reactors, wherein
         a) at least one first reactor containing a reactor bed is present, said bed being bounded by at least one partition, said bed comprising a continuous porous metal extending throughout the first reactor, said bed being fixedly connected to said partition,
         b) at least one second reactor containing a reactor bed is present, said bed comprising a continuous porous metal structure extending throughout the reactor, said bed being fixedly connected to said partition, and
         c) said second reactor, with respect to the first reactor, is disposed on the other side of said partition, so that a heat exchanging contact between said beds is present and the reaction heat of a first chemical reaction which is carried out in said first reactor is supplied or absorbed by carrying out a second chemical reaction in said second reactor;
   b. carrying out said first chemical reaction in said first reactor, wherein reactants for said first chemical reaction, when introduced at an inlet for said first reactor, are at a temperature within a range of 550° C. to 1250° C. and;
   c. carrying out said second chemical reaction in said second reactor.

2. A method according to claim 1, wherein two or more first reactors and/or two or more second reactors and a corresponding number of partitions are used.

3. A method according to claim 2, wherein the reactors are formed by monolith structure of which a part of the channels is used as first reactor and a part of the channels is used as second reactor.

4. A method according to claim 2, wherein each of the reactors is formed by a monolith structure.

5. A method according to claim 4, wherein a multi-stage reaction is carried out, wherein at least one stage of this reaction is exothermic and at least one stage is endothermic, and wherein said stages are carried out in, respectively, said first and second reactors.

6. A method according to claim 1, wherein the porous metal structure of at least one of said reactor beds consists of sintered metal particles.

7. A method according to claim 1, wherein the reactors are formed by monolith structure of which a part of the channels is used as first reactor and a part of the channels is used as second reactor.

8. A method according to claim 1, wherein each of the reactors is formed by a monolith structure.

9. A method according to claim 1, wherein a multi-stage reaction is carried out, wherein at least one stage of this reaction is exothermic and at least one stage is endothermic, and wherein said stages are carried out in, respectively, said first and second reactors.

10. A method according to claim 1, wherein the porous metal structure of at least one of said reactor beds consists of sintered metal fibers.

11. A method according to claim 1, wherein the porous metal structure of at least one of said reactor beds consists of metal foam.

12. A method according to claim 1, wherein both beds consist of porous metal comprising sintered metal particles, sintered metal fibers or metal foam; and a multi-stage reaction is carried out, wherein at least one stage of this reaction is exothermic and at least one stage is endothermic, and wherein said stages are carried out in, respectively, said first and second reactors.

13. The method of claim 1, wherein reactants for said second chemical reaction, when introduced at an inlet for said second reactor, are at a temperature within a range of 600° C. to 1250° C.

14. The method of claim 1, wherein reactants for said second chemical reaction, when introduced at an inlet for said second reactor, are at a temperature within a range of 650° C. to 1250° C.

* * * * *

UNITED STATES PATENT AND TRADEMARK OFFICE
CERTIFICATE OF CORRECTION

PATENT NO. : 6,482,375 B1
DATED : November 19, 2002
INVENTOR(S) : Willem Johan Jacob van der Wal et al.

It is certified that error appears in the above-identified patent and that said Letters Patent is hereby corrected as shown below:

<u>Title page,</u>
Item [57], ABSTRACT,
Line 10, "preset" should read -- present --.

Signed and Sealed this

Twenty-second Day of June, 2004

JON W. DUDAS
*Acting Director of the United States Patent and Trademark Office*